United States Patent
Lagler et al.

(10) Patent No.: US 10,018,708 B2
(45) Date of Patent: Jul. 10, 2018

(54) MEASURING DEVICE AND A MEASURING METHOD ESPECIALLY FOR THE MEASUREMENT OF FMCW SIGNALS

(71) Applicant: Rohde & Schwarz GmbH & Co.KG, Munich (DE)

(72) Inventors: Andreas Lagler, Rosenheim (DE); Clemens Lohmer, Dachau (DE); Luke Cirillo, Poing (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 402 days.

(21) Appl. No.: 14/818,297

(22) Filed: Aug. 4, 2015

(65) Prior Publication Data

US 2016/0033624 A1  Feb. 4, 2016

(30) Foreign Application Priority Data

Aug. 4, 2014  (DE) .......................... 10 2014 215 307

(51) Int. Cl.
  *G01S 7/40*  (2006.01)
  *G01S 13/34*  (2006.01)
(52) U.S. Cl.
  CPC .......... *G01S 7/4004* (2013.01); *G01S 7/4008* (2013.01); *G01S 13/345* (2013.01)
(58) Field of Classification Search
  CPC ..... G01S 13/345; G01S 7/4004; G01S 7/4008
  USPC ........................................................ 342/173
  See application file for complete search history.

(56) References Cited

U.S. PATENT DOCUMENTS

| 4,581,639 A * | 4/1986 | Judge .................. H04N 17/004 178/69 A |
| 2008/0052335 A1 | 2/2008 | Gee |
| 2011/0153247 A1 | 6/2011 | Eckert et al. |
| 2011/0166805 A1 | 7/2011 | Hammer et al. |
| 2013/0213132 A1* | 8/2013 | Wegemann ......... G01F 25/0061 73/290 V |

FOREIGN PATENT DOCUMENTS

| DE | 102004043876 A1 | 3/2006 |
| DE | 102007042042 A1 | 3/2009 |
| DE | 2010020910 A1 | 6/2011 |
| EP | 0667536 A2 | 2/1995 |

* cited by examiner

*Primary Examiner* — Timothy A Brainard
(74) *Attorney, Agent, or Firm* — Potomac Technology Law, LLC

(57) ABSTRACT

A measuring device for measuring a measurement signal of a device under test comprises a processing unit and a display unit. The processing unit comprises a detection unit configured to automatically determine at least one parameter characterizing the measurement signal. The processing unit further comprises a reconstruction unit configured to reconstruct an ideal measurement signal on the basis of the at least one parameter characterizing the measurement signal. The display unit is configured to display the measurement signal or a signal derived from the measurement signal and the reconstructed ideal measurement signal.

12 Claims, 4 Drawing Sheets

MEASURING DEVICE AND A MEASURING METHOD ESPECIALLY FOR THE MEASUREMENT OF FMCW SIGNALS

PRIORITY

This application claims priority of German patent application DE 10 2014 215 307.7 filed on Aug. 4, 2014, which is hereby incorporated herein by reference in its entirety.

FIELD

Embodiments of the present invention relate to a measuring device and a measuring method for the semiautomatic measurement and visualization of signals, especially frequency-modulated continuous-wave radar signals.

BACKGROUND

Frequency-modulated continuous-wave radar signals (FMCW signals) are used in many currently available radar sensors, for example, in the case of near-distance-sensing devices in the automotive sector. By means of the FMCW principle, it is possible to make a targeted statement about the distance and relative velocity of an object relative to the radar sensor. In this context, a frequency-modulated form of a continuously transmitted signal is used, wherein the individual signal portions, so-called chirps, are conventionally intermittently linear, but can provide different gradients, so-called chirp rates. The chirps can also occur in pulsed form. In this context, several chirps, for example, 128, are transmitted per period in a sequence with a subsequent resting time.

The typical signal shape in this context satisfies the following description:

$$FMCW(t) = \sum_{n=1}^{N} \left( \underbrace{\left( \frac{f_n - f_{n-1}}{T_n} \right)}_{Chirprate} \cdot (t - t_n) + f_{n-1} \right) \cdot g(t - t_n; T_n), \quad (1.1)$$

$$\text{for } t \in (t_0, t_N)$$

where:
N is the number of linear segments per signal period
$T_n$ is the time interval with constant chirp rate
$f_n$ is the frequency offset at the end of a linear segment
FMCW(t)=FM(t-P), with the signal period P = $t_n - t_0$
g(t; T) is the window function which takes the value 1 for t ∈ ($t_0$, $t_N$) and is otherwise 0,
t is time
n is the counting index Analyzing these FMCW signals with regard to their key properties represents a substantial point in the development of current and future radar systems. Accordingly, the uniqueness range is determined by the chirp duration, the resolution is determined by the chirp rate, and the measurement accuracy is determined by the linearity of the chirps. These signal properties represents a central component of the overall system and must therefore be known as well as possible. However, it has not yet been possible to provide automation for the automatic detection and evaluation of FMCW signals. The analysis of the characteristic FMCW signal is currently effort-intensive, because the significant parameters of the FMCW signal must be determined individually. This is complicated and susceptible to error, especially in the case of a poor signal-noise ratio.

EP 0 667 536 A2 shows a conventional method for measuring FMCW signals by way of example. With the use of the method shown there, considerable technical knowledge is required of the user. Even if such a considerable technical knowledge is available, an optimal measurement result can be achieved only with considerable effort.

What is needed, therefore, are approaches for a measuring device and measuring method for performing measurement of FMCW signals, and at the same time require only minimal technical knowledge on the part of the user and a minimal operating effort.

SUMMARY OF THE INVENTION

Embodiments of the present invention advantageously address the foregoing requirements and needs, as well as others, by providing approaches for a measuring device and measuring method for performing measurement of FMCW signals, providing the reconstruction and display of an ideal measurement signal alongside the actual measurement signal, facilitating easy identification of whether the characterizing parameter has been correctly automatically detected.

According to a first example embodiment of the present invention, a measuring device is provided for measuring a measurement signal of a device under test. The measuring device comprises a processing unit and a display unit. The processing unit comprises a detection unit configured to automatically determine at least one parameter characterizing the measurement signal. The processing unit further comprises a reconstruction unit configured to reconstruct an ideal measurement signal on the basis of the at least one parameter characterizing the measurement signal. The display device is configured to display the measurement signal, or a signal derived from the measurement signal, and the reconstructed ideal measurement signal. Through the reconstruction and display of an ideal measurement signal alongside the actual measurement signal, it is therefore possible for the user to easily identify whether the characterizing parameter has been correctly automatically detected.

According to a further embodiment, the processing unit further comprises an error-signal unit configured to determine an error signal from the measurement signal, or a signal derived from the measurement signal, and the reconstructed ideal measurement signal by subtraction. In this case, the display device is further configured to display the error signal. By viewing the error signal, the user can accordingly recognize with very low effort whether the reconstructed ideal measurement signal largely corresponds to the actual measurement signal and accordingly the parameter characterizing the measurement signal has been correctly automatically detected.

By way of example, the detection unit includes a transformation unit configured to transform the measurement signal, or a signal derived from the measurement signal, into the frequency domain. By way of further example, additionally or alternatively, the detection unit includes a filter configured to apply a noise reduction to the measurement signal, or to a signal derived from the measurement signal, by filtering. By way of further example, additionally or alternatively, the detection unit includes a segment-determining unit configured to determine linear segments of the measurement signal or of a signal derived from the measurement signal, or of the measurement signal transformed into the frequency domain. By way of further example, additionally or alternatively, the detection unit includes a regression unit configured to determine the at least one parameter characterizing the measurement signal by means of a regression calculation. In this manner, a particularly accurate determination of the at least one parameter characterizing the measurement signal can be implemented.

According to a further embodiment, the processing unit further comprises an adjustment unit configured to vary the at least one parameter characterizing the measurement signal determined by the detection unit on the basis of a manual adjustment by a user. In this context, the adjustment may be implemented by displacing points of the reconstructed ideal measurement signal on the display unit. If the processing unit provides an error-signal unit, the latter is embodied in this case to re-calculate the error signal on the basis of the varied, at least one parameter characterizing the measurement signal. In this case, the display unit is further configured to display the re-calculated error signal. Accordingly, the user can immediately recognize how the manual adjustment has influenced the error signal. A particularly accurate measurement of the measurement signal is possible in this manner.

By way of example, the measurement signal comprises a frequency-modulated continuous-wave radar signal (FMCW).

By way of further example, the detection unit is configured to determine several parameters characterizing the measurement signal, and the reconstruction unit is configured to reconstruct the ideal measurement signal on the basis of the several parameters characterizing the measurement signal. A particularly accurate measurement of the measurement signal is possible in this manner.

By way of further example, the parameters characterizing the measurement signal comprise a gradient of a segment of the measurement signal transformed into the frequency domain, a chirp duration of a portion of the measurement signal transformed into the frequency domain, a chirp rate of a portion of the measurement signal transformed into the frequency domain, or a discontinuity position of the gradient of the measurement signal transformed into the frequency domain. In this manner, relevant parameters of the measurement signal can be determined in a very flexible manner. A very accurate measurement of the measurement signal is therefore possible.

According to a second example embodiment of the present invention, a method is provided for the measurement of a measurement signal of a device under test. At least one parameter of the measurement signal characterizing the measurement signal is determined. On the basis of the at least one parameter characterizing the measurement signal, an ideal measurement signal is reconstructed. In this context, the measurement signal, or a signal derived from the measurement signal, and the reconstructed ideal measurement signal are displayed on a display. Through the reconstruction and display of an ideal measurement signal alongside the actual measurement signal, it is therefore possible for the user to easily identify whether the characterizing parameter has been correctly automatically detected.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The accompanying drawings, which are incorporated in and form a part of the specification, illustrate an example embodiment of the present invention and, together with the description, serve to explain the principles of the invention. In the drawings.

DETAILED DESCRIPTION

Approaches for a measuring device and measuring method for performing measurement of FMCW signals are described. Such approaches, among other features, provide the reconstruction and display of an ideal measurement signal alongside the actual measurement signal, which facilitates easy identification of whether the characterizing parameter has been correctly automatically detected. In the following description, for the purposes of explanation, numerous specific details are set forth in order to provide a thorough understanding of the embodiments of the invention. It would be apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
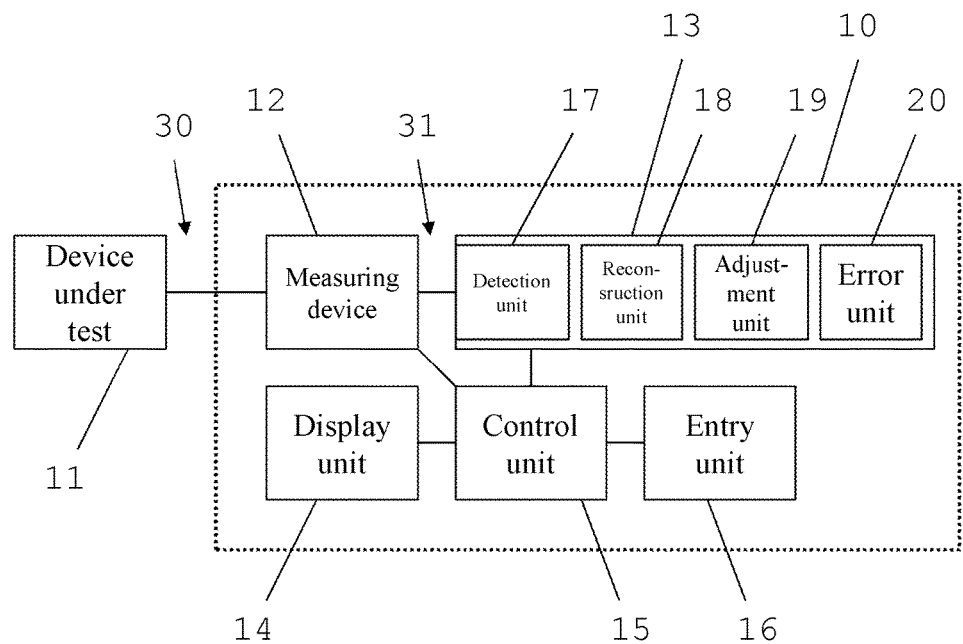
FIG. 1 illustrates a block diagram depicting a measuring device, in accordance with example embodiments of the present invention.
Figure 2:
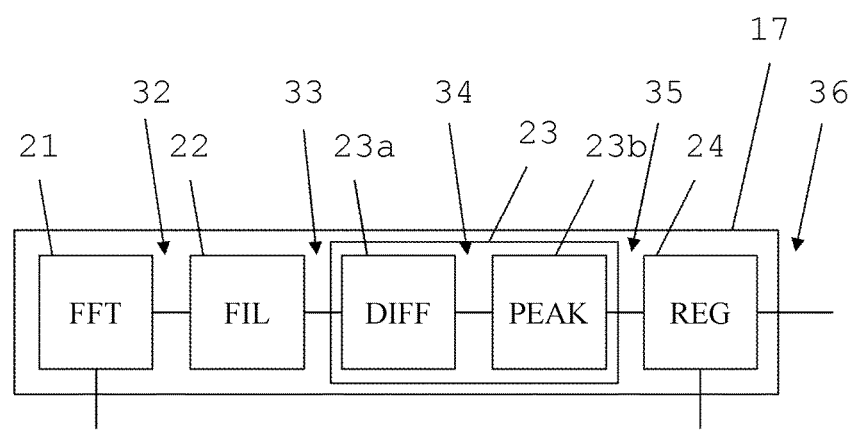
FIG. 2 illustrates a block diagram depicting the detection unit of FIG. 1, in accordance with example embodiments of the present invention.
Figure 3:
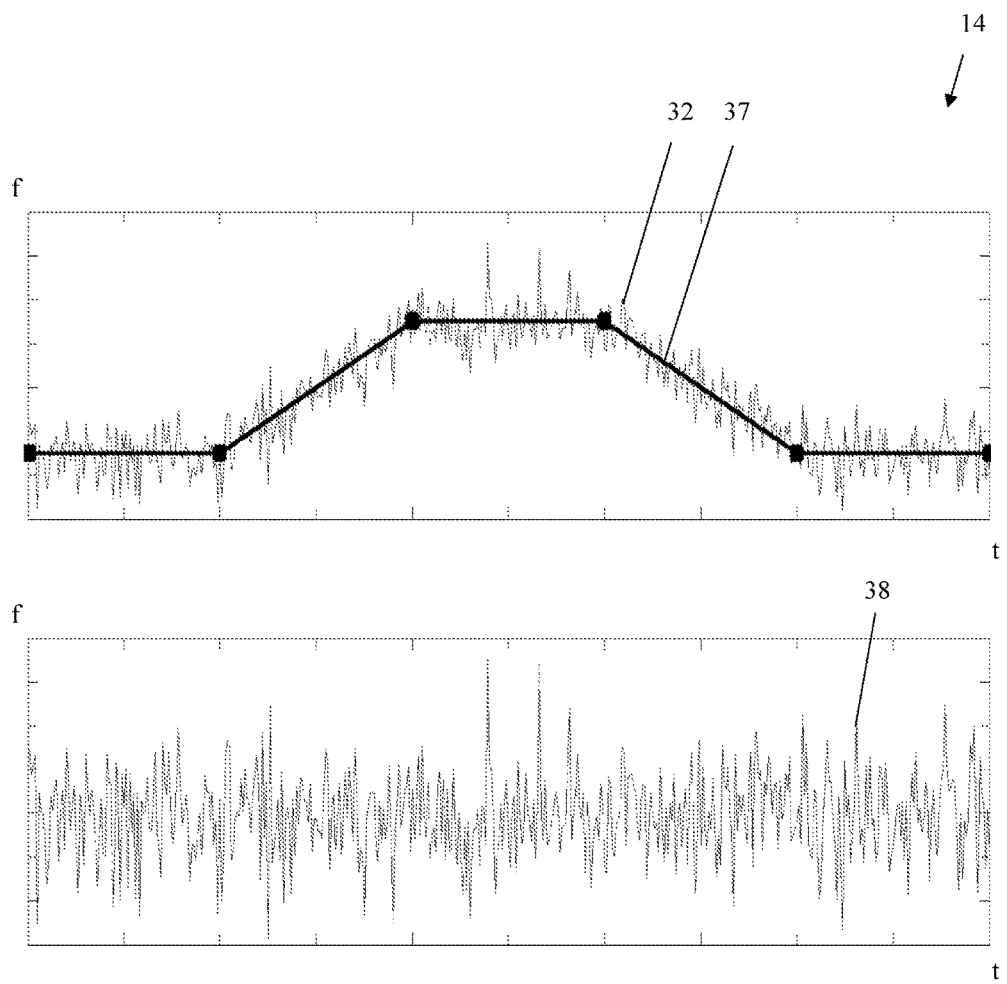
FIG. 3 illustrates a view of the display unit of FIG. 1, in accordance with example embodiments of the present invention.

With reference to FIGS. 1-2, approaches for the configuration and operation of a measuring device according to example embodiments of the present invention is first described. With reference to FIG. 3, the visual display of the measured results is then be described in the context of example embodiments of the present invention. A measuring method according to example embodiments of the present invention is then described with reference to FIGS. 4-5.

FIG. 1 illustrates a block diagram depicting a measuring device 10, in accordance with example embodiments of the present invention. The measuring device 10 is connected to a device under test 11. The measuring device 10 includes a measurement unit 12, a processing unit 13, a display unit 14, a control unit 15 and an entry unit 16. The measurement unit 12 is connected to the control unit 15 and to the processing unit 13. The processing unit 13 includes a detection unit 17, a reconstruction unit 18, an adjustment unit 19 and an error-signal unit 20. The processing unit 13 is also connected to the control unit 15. The display unit 14 and the entry unit 16 are each connected only to the control unit 15. The device under test 11, which is not part of the measuring device 10, is connected to the measurement unit 12 of the measuring device 10.

The device under test 11 generates a measurement signal 30 which is received and measured by the measurement unit 12. A digitized and optionally frequency-reduced measurement signal 31 is transmitted from the measurement unit 12 to the processing unit 13.

The measurement signal 31 is then supplied to the detection unit 17 within the processing unit 13. The detection unit 17 detects one or more parameters of the measurement signal 31 which characterize the measurement signal 31. These parameters are, for example, a gradient of a segment of the measurement signal transformed into the frequency domain, a chirp duration of a portion of the measurement signal, a chirp rate of a portion of the measurement signal or a discontinuity point of the gradient of the measurement signal transformed into the frequency domain. Further relevant parameters which characterize the measurement signal in the frequency domain include the total period, the bandwidth and non-linearities of the measured measurement signal. Further parameters can also be determined by the detection unit 17.

The parameters determined by the detection unit 17, which characterize the measurement signal 31, are supplied to the reconstruction unit 18. On the basis of the parameters communicated, the reconstruction unit 18 reconstructs an ideal measurement signal, that is, an idealized version of the measurement signal 31 without interference and without noise. The reconstructed ideal measurement signal and the measurement signal 31 are displayed by the display unit 14, by means of the entry unit 16 under the control of the control unit 15.

Additionally, the error-signal unit 20 may also generate an error signal that corresponds to a difference signal between the measurement signal 31 and the ideal measurement signal. In this case, the error signal is also displayed by the display unit 14, by means of the entry unit 16 under the control of the control unit 15. Since the automatic detection of the parameters of the measurement signal by the detection unit 17 does not always lead to satisfactory results, especially in the case of strongly disturbed measurement signals, a manual adjustment can be implemented by means of the adjustment unit 19.

It is therefore possible, by means of the entry unit 16, to act on the ideal measurement signal after the display of the measurement signal 31 and of the ideal measurement signal. In particular, nodes of the ideal measurement signal transformed into the frequency domain can be manually displaced on the display unit 14. While the ideal measurement signal is adapted in this manner, the error-signal unit 20 simultaneously updates the associated error signal. In this manner, it is possible for a user to have a direct overview of the influence of the manual adjustment on the resulting error signal.

In the manual adjustment, regions of the measured signal which have not been correctly registered through the automatic detection by the detection unit 17 can be determined by defining an inclusion range on the display unit 14, for example, by marking a circle with a variably adjustable radius. As already mentioned, the corresponding parameters characterizing the measurement signal 31 can then also be determined for the selected regions.

Further, an iterative detection and adjustment is possible. For example, after the manual adjustment 19, a new, automatic detection of the parameters can be implemented on the basis of the entries for the adjustment.

FIG. 2 illustrates a block diagram depicting the detection unit 17 of FIG. 1, in accordance with example embodiments. In this context, the detection unit 17 includes a transformation unit 21 configured to transform the measurement signal 31 into the frequency domain. A resulting measurement signal in the frequency domain 32 is supplied to a filter unit 22 configured to perform a noise reduction of the measurement signal in the frequency domain 32 by filtering. The resulting filtered measurement signal in the frequency domain 33 is supplied to a segment-determining unit 34 which determines segments of the measurement signal, such as linear segments of the measurement signal 33. If linear segments of the measurement signal 33 are to be detected, the segment-determining unit 23 includes a differentiation unit 23a configured to generate the second derivative of the filtered measurement signal in the frequency domain 33. Further, the segment-determining unit 23 may include a maxima-determining unit 23b configured to identify linear portions of the filtered measurement signal in the frequency domain 33 by determining minima and maxima of the second derivation 34.

The segments determined by the segment-determining unit 23 are transmitted as a signal 35 to a regression unit 24 configured to perform a regression calculation and, in this manner, determine the parameters characterizing the measurement signal. In this context, the digitized and frequency-reduced measurement signal 31 is supplied to the transformation unit 23 and also to the regression unit 24. The resulting parameters are communicated as a signal 36 to the reconstruction unit 18.

Additionally, the processing unit 13 can further comprise a data bank configured to store known signal shapes in the form of their characterizing parameters. After the parameter or parameters characterizing the present measurement signal 31 have been determined, they can be compared with the parameters stored in the databank. If an agreement or an approximate agreement is found, the parameters stored in the databank can be used, optionally, instead of the determined parameters characterizing the measurement signal 31 for the reconstruction by the reconstruction unit 18.

In determining the parameters characterizing the measurement signal 31, an existing time offset and/or frequency offset can optionally be compensated. That is, in this case, only the relative signal shape of the measurement signal 31 is investigated. This is relevant especially if the measuring device 10 is not supplied with a high-precision reference signal, or respectively the reference signal of the measuring device 10 deviates from a reference signal of the device under test 11.

Alternatively, a time offset and/or a frequency offset of the measurement signal 31 can also be used as the parameter characterizing the measurement signal 31. This is relevant, for example, if the measuring device 10 is supplied with a high-precision reference signal which is preferably synchronized with a reference signal of the device under test 11.

In addition to exploiting the previously described linear segments, non-linear segments of the measurement signal 31 can also be measured and used for the characterization of the measurement signal 31. Even if, at the present time, conventional FMCW systems use only linear portions of the signal in the frequency domain, the use of such non-linear portions is conceivable in future applications. In this case, a further parameter which characterizes such a non-linear signal portion could be the inclination of the gradient or a radius of curvature. Other parameters characterizing the measurement signal in the case of a non-linear course of the measurement signal in the frequency domain could be the parameters of a polynomial which define the course of the non-linear portion in the frequency domain.

FIG. 3 illustrates a view of the display unit 14 of FIG. 1, in accordance with example embodiments. In this context, a measurement signal in the frequency domain 32 and an ideal measurement signal 37 are displayed in an upper diagram. It is clearly evident that the ideal measurement signal 37 consists of several linear segments which are separated from one another by nodes. In the case of a previously described adjustment, the position of the corresponding nodes could be manually displaced. Alternatively, additional nodes could be inserted. A change of the linear course of a segment into a non-linear course could also take place in the case of the adjustment.

Furthermore, an error signal 38 which corresponds to a difference between the measurement signal 32 in the frequency domain and the ideal measurement signal 37 is shown in the lower diagram. In this context, the error signal 38 is automatically matched to the current ideal measurement signal 37 during the adjustment. Accordingly, the user can immediately recognize whether the adjustment has achieved a better setting of the measurement signal than the automatic detection or not.

Figure 4:
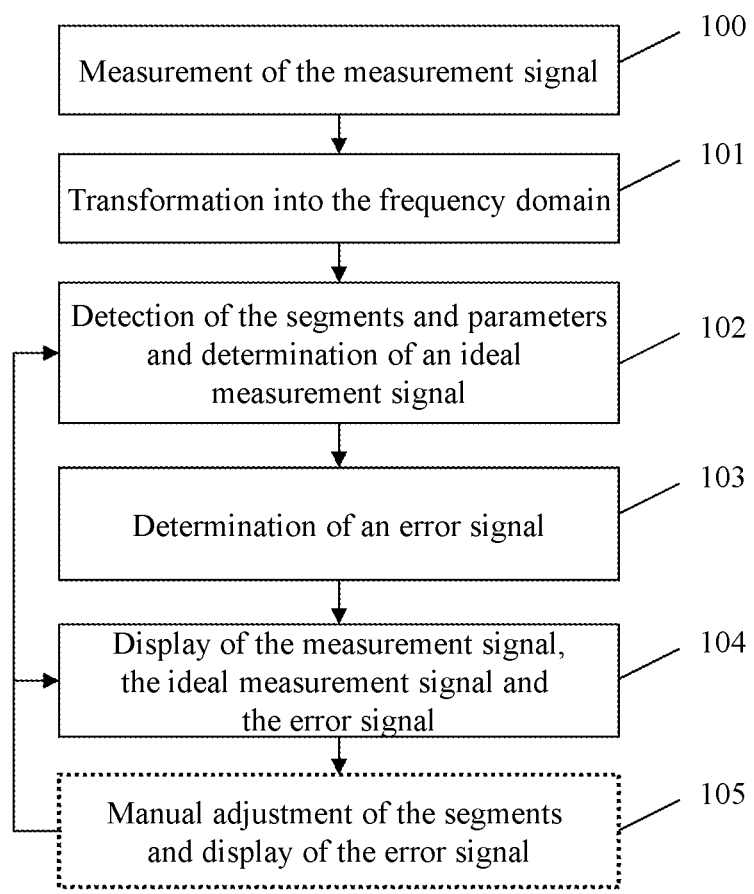
FIG. 4 illustrates a flow diagram of a measuring method, in accordance with example embodiments of the present invention.

FIG. 4 illustrates a flow diagram of a measuring method, in accordance with example embodiments of the present invention. In a first step 100, a measurement signal from the device under test is measured. In a second step 101, the measurement signal is transformed into the frequency domain. In a third step 102, segments of the measurement signal in the frequency domain are detected and parameters which characterize the measurement signal in the frequency domain are determined. Further, on the basis of the segments and parameters, an ideal measurement signal is reconstructed. With regard to the function of step 102, reference is made to the deliberations relating to FIG. 5.

In a fourth step 103, an error signal is determined by subtraction of the measurement signal in the frequency domain and the reconstructed ideal measurement signal. In a fifth step 104, the measurement signal, the ideal measurement signal and the error signal are displayed, for example, as shown in FIG. 3. Finally, in an optional sixth step 105, the segments of the ideal measurement signal are manually adjusted on the display unit. In this context, the gradients, the curvatures, corner points etc. of the segments can be displaced. In this manner, the ideal measurement signal is varied. This manual adjustment of the ideal measurement signal has a direct influence on the display of the ideal measurement signal and also of the error signal. This is displayed by returning to the fifth step 104. Further, an iterative determination of the ideal measurement signal can be additionally implemented. In this case, a new automatic detection of the segments and parameters and a determination of the ideal measurement signal in step 102 is implemented after every adjustment.

Figure 5:
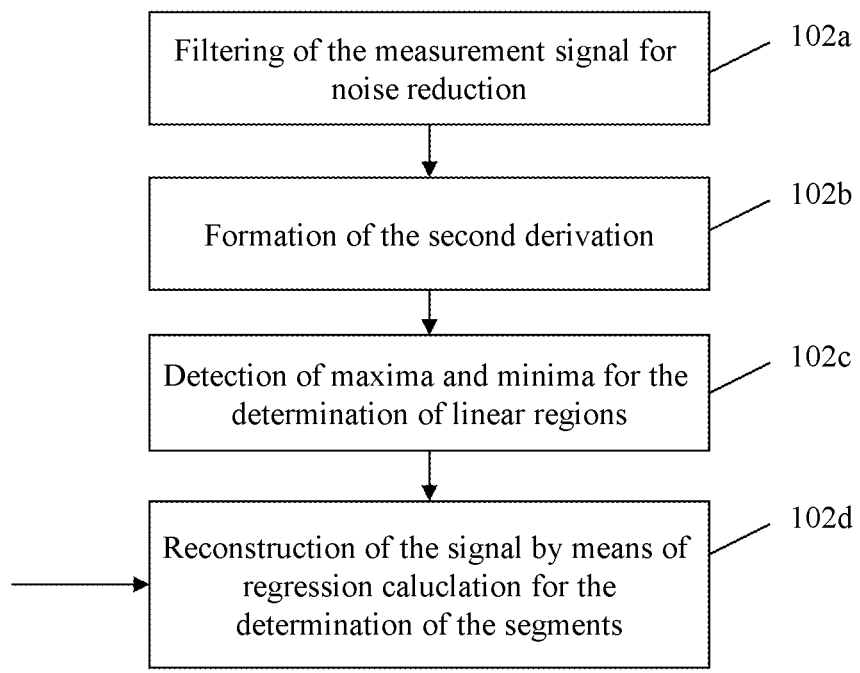
FIG. 5 illustrates a flow chart of the detection step of FIG. 4, in accordance with example embodiments of the present invention.

FIG. 5 illustrates a flow chart of the detection step of FIG. 4, in accordance with example embodiments. In a first sub-step 102*a*, a filtering of the measurement signal in the frequency domain is implemented in order to achieve a reduction of the noise. In a second step 102*b*, with the assumption of linear segments, the second derivation of the noise-reduced measurement signal in the frequency domain is formed. In a third sub-step 102*c*, maxima and minima of the second derivation are determined in order to determine linear regions of the measurement signal in the frequency domain in this manner. In a fourth step 102*d*, the concrete parameters which characterize the measurement signal in the frequency domain are determined on the basis of a regression calculation, and the ideal measurement signal is reconstructed in this manner.

In this context, the invention is not restricted to the exemplary embodiment presented. In particular, the measurement signals need not necessarily be FMCW signals. It is advantageous that all of the features described above or features shown in the drawings can be combined arbitrarily with one another within the scope of the invention.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. An apparatus for measuring a measurement signal of a device under test, comprising:
    a processing unit, which comprises (a) a detection unit configured to automatically determine at least one parameter characterizing the measurement signal, (b) a reconstruction unit configured to reconstruct an ideal measurement signal based on the at least one parameter characterizing the measurement signal, (c) an error-signal unit configured to determine an error signal based on one of the measurement signal and a signal derived from the measurement signal, and based on the reconstructed ideal measurement signal, by subtraction, and (d) an adjustment unit configured to adjust the at least one parameter characterizing the measurement signal based on a user adjustment; and
    a display unit configured to display one of the measurement signal and the signal derived from the measurement signal, along with the reconstructed ideal measurement signal, and to display the error signal; and
    wherein the error-signal unit is configured to recalculate the error signal based on the adjusted at least one parameter, and the display unit is configured to display the recalculated error signal.

2. The apparatus according to claim 1, wherein the detection unit comprises a one of the following:
    a transformation unit configured to transform one of the measurement signal and the signal derived from the measurement signal into the frequency domain, or
    a filter configured to apply a noise reduction to one of the measurement signal and the signal derived from the measurement signal;
    a segment-determining unit configured to determine segments of one of the measurement signal and the signal derived from the measurement signal;
    a regression unit configured to determine the at least one parameter characterizing the measurement signal by means of a regression calculation.

3. The apparatus according to claim 1, wherein the measurement signal is a frequency-modulated continuous-wave radar signal.

4. The apparatus according to claim 1, wherein the detection unit is configured to determine a plurality of parameters characterizing the measurement signal, and the reconstruction unit is configured to reconstruct the ideal measurement signal based on the plurality of parameters characterizing the measurement signal.

5. The apparatus according to claim 4, wherein the plurality of parameters characterizing the measurement signal comprise one of at least one gradient of a segment of the measurement signal transformed into the frequency domain, at least one chirp duration of a portion of the measurement signal transformed into the frequency domain, at least one chirp rate of a portion of the measurement signal transformed into the frequency domain, and a discontinuity point of a gradient of the measurement signal transformed into the frequency domain.

6. The apparatus according to claim 1, wherein the at least one parameter characterizing the measurement signal comprises one of a gradient of a segment of the measurement signal transformed into the frequency domain, a chirp duration of a portion of the measurement signal transformed into the frequency domain, a chirp rate of a portion of the measurement signal transformed into the frequency domain, and a discontinuity point of a gradient of the measurement signal transformed into the frequency domain.

7. A method for measuring a measurement signal of a device under test, the method comprising:
determining at least one parameter characterizing the measurement signal;
reconstructing an ideal measurement signal based on the at least one parameter characterizing the measurement signal;
determining an error signal based on one of the measurement signal and the signal derived from the measurement signal, and based on the reconstructed ideal measurement signal, by subtraction;
displaying one of the measurement signal and a signal derived from the measurement signal, along with the reconstructed ideal measurement signal, and displaying the error signal;
adjusting the at least one parameter characterizing the measurement based on a user adjustment;
re-calculating the error signal based on the adjusted at least one parameter; and
displaying the re-calculated error signal.

8. The method according to claim 7, further comprising one of:
transforming one of the measurement signal and the signal derived from the measurement signal into the frequency domain;
filtering one of the measurement signal and the signal derived from the measurement signal for noise reduction;
determining segments of one of the measurement signal and the signal derived from the measurement signal; and
performing the determination of the at least one parameter characterizing the measurement signal via a regression calculation.

9. The method according to claim 7, wherein the measurement signal is a frequency-modulated continuous-wave radar signal.

10. The method according to claim 7, wherein a plurality of parameters characterizing the measurement signal are determined, and the ideal measurement signal is reconstructed based on the plurality of parameters characterizing the measurement signal.

11. The method according to claim 10, wherein the plurality of parameters characterizing the measurement signal comprise one of at least one gradient of a segment of the measurement signal transformed into the frequency domain, at least one chirp duration of a portion of the measurement signal transformed into the frequency domain, at least one chirp rate of a portion of the measurement signal transformed into the frequency domain, and a discontinuity point of a gradient of the measurement signal transformed into the frequency domain.

12. The method according to claim 7, wherein the at least one parameter characterizing the measurement signal comprises one of a gradient of a segment of the measurement signal transformed into the frequency domain, a chirp duration of a portion of the measurement signal transformed into the frequency domain, a chirp rate of a portion of the measurement signal transformed into the frequency domain, and a discontinuity point of a gradient of the measurement signal transformed into the frequency domain.

* * * * *